United States Patent [19]
Boyesen

[11] Patent Number: 5,243,934
[45] Date of Patent: Sep. 14, 1993

[54] MULTIPLE STAGE REED VALVES FOR USE IN INTERNAL COMBUSTION ENGINES

[76] Inventor: Eyvind Boyesen, R.D. #2, Box 246A, Kempton, Pa. 19529

[21] Appl. No.: 259

[22] Filed: Jan. 4, 1993

[51] Int. Cl.$^5$ ............................................. F16K 15/16
[52] U.S. Cl. ................... 123/73 V; 123/65 V; 137/855; 137/512.15
[58] Field of Search .................. 123/73 V, 65 V; 137/512.15, 512.1, 855, 856

[56] References Cited

U.S. PATENT DOCUMENTS

| | | |
|---|---|---|
| 157,791 | 12/1974 | Cameron . |
| 351,121 | 10/1886 | Meyer . |
| 919,036 | 4/1909 | Langer . |
| 939,549 | 11/1909 | Reineking . |
| 2,065,062 | 12/1936 | Dugelay . |
| 2,382,716 | 8/1945 | Herzmark . |
| 2,689,552 | 9/1954 | Kiekhaefer . |
| 3,286,728 | 11/1966 | Stephenson . |
| 3,690,304 | 9/1972 | Schneider et al. . |
| 3,859,968 | 1/1975 | Stinebaugh . |
| 3,896,847 | 7/1975 | Bauer et al. . |
| 3,905,340 | 9/1975 | Boyesen . |
| 3,905,341 | 9/1975 | Boyesen . |
| 4,000,723 | 1/1977 | Boyesen . |
| 4,051,820 | 10/1977 | Boyesen . |
| 4,082,295 | 4/1978 | Bainard ........................... 137/856 |
| 4,083,184 | 4/1978 | Ushijima et al. . |
| 4,089,348 | 5/1978 | Yoshida et al. . |
| 4,191,138 | 3/1980 | Jaulmes . |
| 4,250,844 | 2/1981 | Tews . |
| 4,257,458 | 3/1981 | Kondo et al. . |
| 4,324,097 | 4/1982 | Schmitt et al. . |
| 4,331,118 | 5/1982 | Cullinan . |
| 4,408,579 | 10/1983 | Kusche . |
| 4,633,825 | 1/1987 | Flaig . |
| 4,643,139 | 2/1987 | Hargreaves ................... 123/65 V |
| 4,696,263 | 9/1987 | Boyesen ........................ 137/855 |
| 4,712,520 | 12/1987 | Pasquin . |
| 4,879,976 | 11/1989 | Boyesen ........................ 123/65 V |
| 5,010,918 | 4/1991 | Tolsma ........................ 137/512.15 |
| 5,036,806 | 8/1991 | Rarick ............................ 123/73 V |
| 5,092,288 | 3/1992 | Staerzl ............................ 137/855 |
| 5,143,027 | 9/1992 | Bergeron ........................ 123/73 V |
| 5,176,170 | 1/1993 | Boyesen ......................... 123/73 V |

FOREIGN PATENT DOCUMENTS

| | | |
|---|---|---|
| 55-5476 | 1/1980 | Japan . |
| 54278 | 3/1983 | Japan . |

OTHER PUBLICATIONS

"Boyesen Rad Valve," Dirt Wheels, Oct. 1988, p. 31.
Advertisement of Land & Sea Co., "High Performance Reeds," date unknown, pp. 18-19.

Primary Examiner—E. Rollins Cross
Assistant Examiner—M. Macy
Attorney, Agent, or Firm—Logan & Simkanich

[57] ABSTRACT

The present invention provides improved multiple stage reed valve construction for internal combustion engines. The reed valves comprise first stage reed valves with multiple ports in the first stage reed valve. Beams having a smoothly shaped curve from the base of the first stage reed valve to the apex thereof and narrowing toward the apex separate adjacent ports. The reed valves of the present invention provide significant improvements in engine operation.

13 Claims, 5 Drawing Sheets

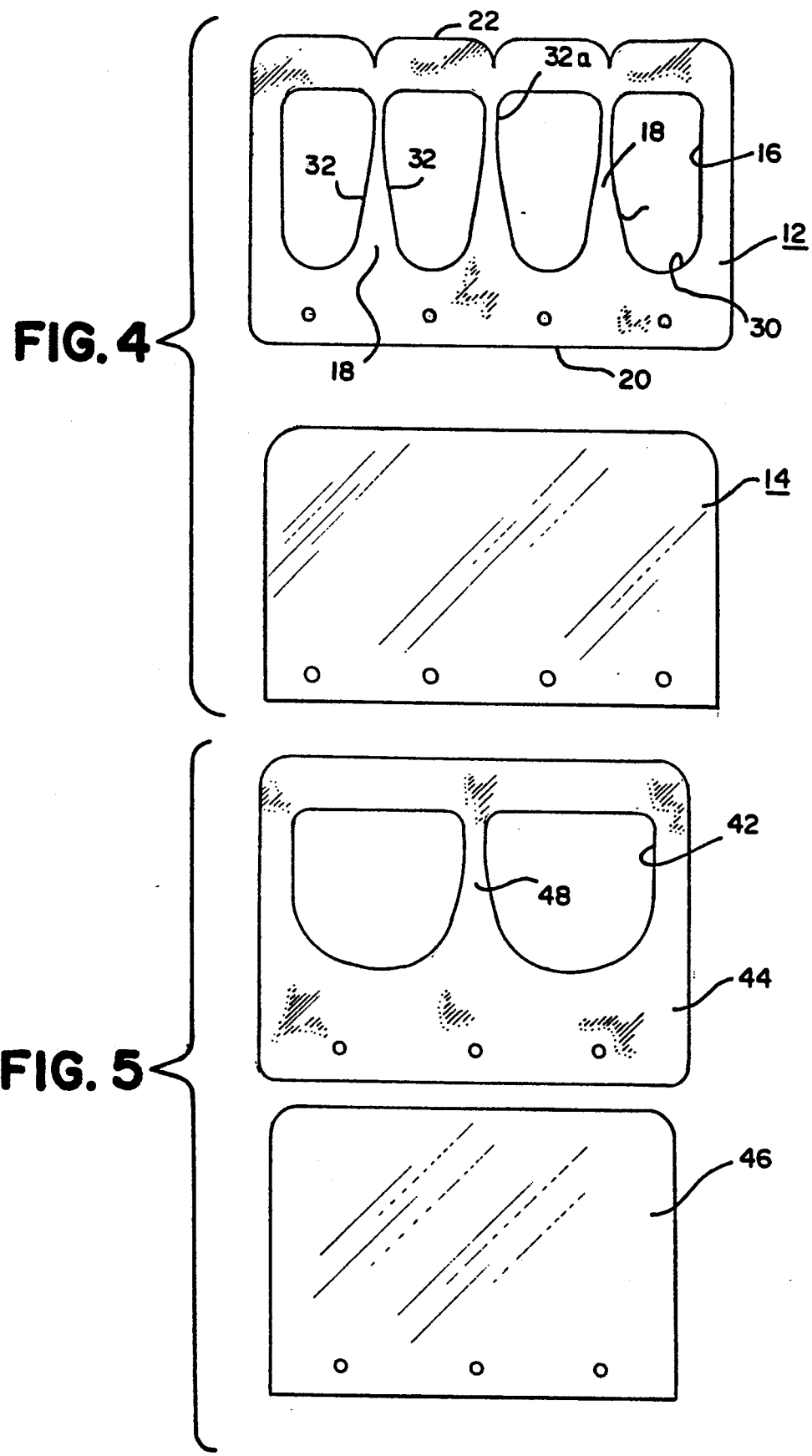

MULTIPLE STAGE REED VALVES FOR USE IN INTERNAL COMBUSTION ENGINES

BACKGROUND OF THE INVENTION

1. Field of the Invention

The present invention relates to valves for controlling fluid flow in an internal combustion engine. More particularly, the present invention relates to reed valves for controlling intake and/or transfer fluid flow in such engines.

2. Background of the Prior Art

Reed valves are presently widely employed in internal combustion engines to control air or air/fuel intake. In two-stroke cycle engines, such as disclosed in U.S. Pat. Nos. 3,905,340, 3,905,341, and 4,051,820, such reed valves play an important role in supporting the improved operation of the engine and the proper transfer of air and fuel from crankcase to combustion chamber. More recently, such reed valves also have been employed in four-stroke cycle engines to control air intake and improve engine performance.

In U.S. Pat. No. 3,905,340 it is disclosed that significant improvements in reed valve life and performance may be achieved by substituting a multiple stage reed valve design in place of a conventional single stage reed. In the design disclosed in that patent, a relatively stiff primary reed is utilized having ports therein. A secondary reed member is then oriented over the ports in the primary reed, with a secondary reed petal sealing each of the primary reed ports. The secondary reed member provides fluid flow through the ports in the primary reed member. In order to allow such flow, the secondary reed members are far more flexible than the primary reed so that the secondary reed member opens farther than the primary reed during the pressure changes each engine cycle. The invention of the '340 patent improves engine performance in virtually all applications and, due to the reduced stresses inherent with this design, reed valve life is dramatically increased.

Although the multi-stage reed disclosed in U.S. Pat. No. 3,905,340 functions very well, it has been found that further improvements are possible. One problem is that many intake passages have uneven flow distribution through them which results in greater stress placed on certain petals of the secondary reed. As a result of the increased stresses placed on only some of the reed petals, the over-stressed petals will undergo material fatigue and break far more rapidly than less stressed reed petals. Applicant's U.S. Pat. No. 4,696,263 attempts to address this problem in part by providing a protective coating of synthetic rubber on the reed valves to prolong their life.

Further, uneven flow distribution through the air intake, conventional or multi-staged reeds do not provide optimum air intake distribution into the engine. One solution to this problem is addressed in applicant's U.S. Pat. No. 4,879,976 for an aeroform reed valve cage which modifies the intake passage upstream from the reed valves so to provide more even air flow through the reed valves. Another approach to solving this problem is disclosed in U.S. Pat. No. 5,036,806 which calls for joining together the reed petals of the secondary reed member to improve intake flow and reduce reed petal fatigue. A further approach to improving reed valve performance is shown in applicant's U.S. patent application Ser. No. 740,447, now allowed U.S. Pat. No. 5,176,170, which employs thicker reed valve material and wider reed ports and petals for improved life and flow characteristics.

Notwithstanding these advances, additional improvements in reed valve performance and life are shown to be possible. First, smoother, less turbulent flow is possible by controlling the flexing of the primary reed to provide a smooth uniform bend from the base of the reed to its apex. It has been determined that this can be accomplished by carefully controlling the shape of the beam or beams between adjacent ports of a multi-ported primary reed so that regardless of the pressure on the reed valve there is a uniform bend along its entire height. Also, it has been determined that by making the beams between adjacent ports as narrow as possible as they approach the apex of the primary reed, a further contribution to more smooth flow is realized. In combination with this primary reed, a secondary reed of rectangular shape with no interruptions, openings or slots, and covering all ports in the primary reed further contributes to smoother, less turbulent flow through the valve.

Of greater importance in improving reed valve performance is controlling the relative opening of the primary reed and secondary reed. The conventional approach to dual stage reed valves was to have the second stage reed open first with a low pressure differential, followed by opening of the primary reed upon increased pressure differential. However, it has been found that increased flow rates and increased power can be obtained by having both the secondary and primary reeds initiate their opening substantially simultaneously. It has further been determined that the rate of opening of the primary reed should be approximately one-half of that of the secondary reed for maximum performance. By controlling the contour of the primary reed member and movement of the secondary reed member, the desired relationship of movement of the primary and secondary reed members can be obtained. Further, the same means for controlling opening of the reed members can be utilized to control the bending of the reed members so that the reed members bend in an arcuate form of uniform radius, thereby eliminating stress concentrations, prolonging life of the reed members and providing flow conditions with minimum turbulence.

Accordingly, it is a primary object of the present invention to provide an improved reed valve which provides all the benefits of prior multi-stage reed valves while having improved flow characteristics, improved performance, and further increased operating life.

It is a further object of the present invention to provide a reed valve with the above advantages which employs a novel design and shape of the beams between ports of a multi-port primary reed for improved flow characteristics.

A further object of the present invention is to provide novel reed valve members for a multi-stage reed valve wherein the primary and secondary reed valve members initiate their opening substantially simultaneously and the primary reed valve member opens at a rate approximately one-half of that of the secondary reed valve member, providing improved flow characteristics.

It is another object of the present invention to provide a reed valve with the above advantages which better complements advancements in aerodynamic reed cage technology.

It is an additional object of the present invention to provide a reed valve with the above advantages which is straightforward in design and adds no weight, complexity, or expense to the engine or the air intake system.

These and other objects of the present invention will become evident from review of the following specification.

SUMMARY OF THE INVENTION

The present invention provides an improved multi-stage reed valve for use in all form of internal combustion engines. In its most basic form, the reed valves of the present invention comprise a first reed valve member with multiple ports and beams between the ports curving smoothly from a greater width at the base of the primary reed to a narrow width approaching the apex of the reed to control curvature of the reed at all flow rates and pressures. Also, a generally uninterrupted rectangular secondary reed extends over all of the ports of the primary reed.

When compared with conventional single and multi-stage reed valves, the present invention provides considerably improved flow and increased engine output throughout the power band.

The present invention is believed to provide improved operation in all forms of internal combustion engines, and particularly in two-stroke cycle engines where they assist in regulating both fluid intake and compressed fluid transfer. Further, the present invention provides even greater improvements when combined with recent innovations in aeroform reed cage construction.

DESCRIPTION OF THE DRAWINGS

The operation of the present invention should become apparent from the following description when considered in conjunction with the accompanying drawings, in which:

FIG. 4 is a plan view of the first stage and second stage reed members of the embodiment of FIG. 1 of the present invention;

FIG. 5 is a plan view of a further embodiment of the first stage and second stage reed members of the present;

DETAILED DESCRIPTION OF THE INVENTION

The present invention provides an improved reed valve for controlling intake and/or transfer fluid flow in all forms of internal combustion engines.

Figure 1:
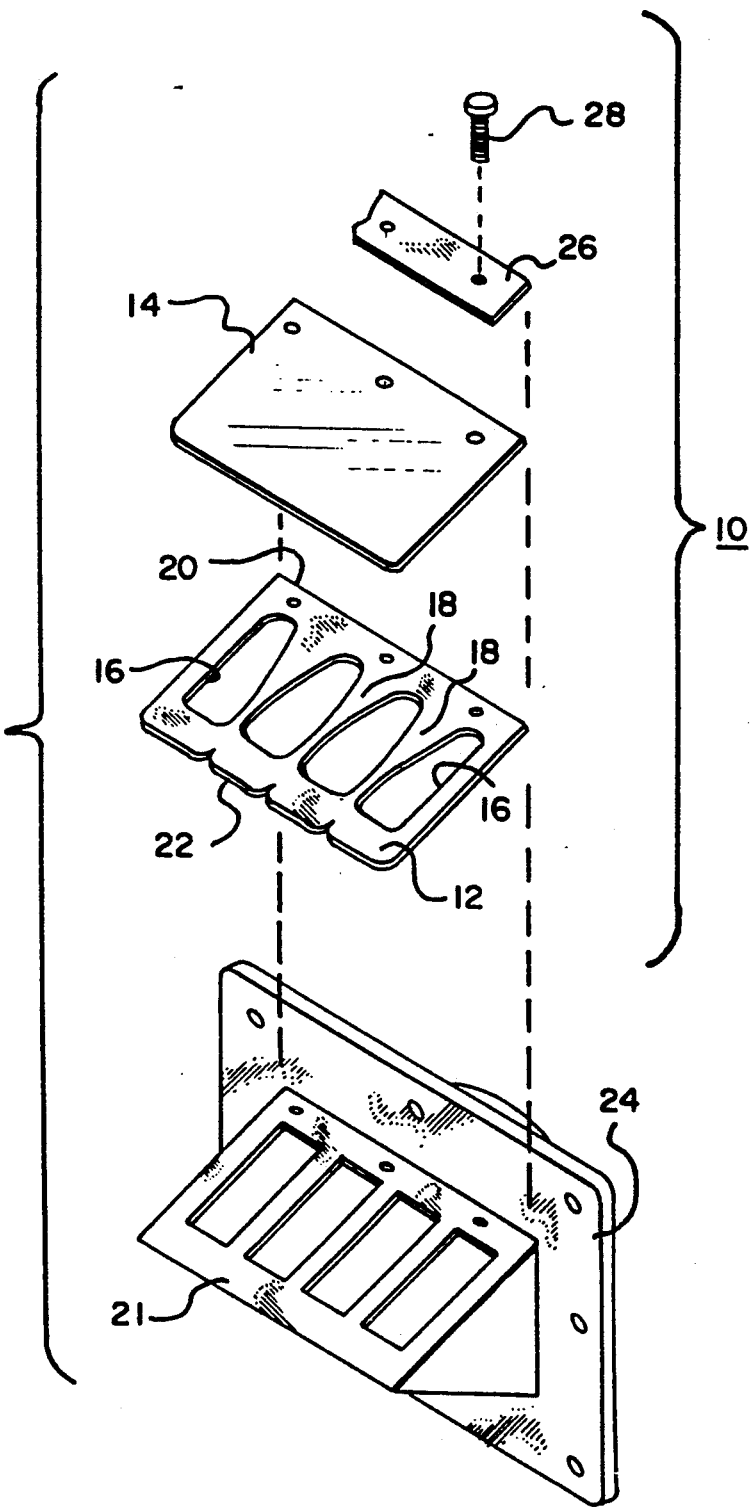
FIG. 1 is an exploded three-quarter isometric view of one embodiment of the reed valve of the present invention shown with an aeroform reed cage.

As shown in FIG. 1, the reed valve 10 of the present invention comprises a first stage reed member 12 and a second stage reed member 14. The first stage reed member 12 has formed therein a series of ports 16 separated by beam sections 18 extending from the base 20 of the reed toward the apex 22 thereof. The second stage reed member 14 is of uninterrupted generally rectangular shape. The second stage reed member is proportioned to cover all of the ports 16 in the first stage reed member 12 when the reed valve is closed. As shown, the reed members are adapted to be mounted to a reed cage 24 by any known means, such as employing a mounting strip 26 and mounting screws 28.

In accordance with the present invention, the primary reed is so designed that it will bend or curve uniformly heigthwise from its base to its apex at all flow rates and pressures. The beams 18 between adjacent ports are utilized to control the deflection of the primary reed 12. With reference to FIG. 4, it can be seen that the beam sections 18 are wider at the base of the reed 12 than at the apex. Each side edge of each beam is curved in a parabolic form from a wider section at the base to a narrower section at the apex of the reed valve member. The shape of the side edge of each beam may be defined by the formula $$F/L = bd^2/6$$

where
F is the force applied to the beam
L is the distance from the base of the beam to the point where the width is measured
b is the thickness of the beam
d is the width of the beam at a specified L The base of each port 16 is curved as shown at 30 and merges gradually into the curved side edge 32 of the beam 18. Each curved side edge of the beams approaches a straight section 32a adjacent the apex of the primary reed 12 with the width of the beam at the apex as narrow as possible. The side edges of the primary reed adjacent the outermost ports 16 are of uniform width so that the entire flexing of the reed is controlled by the intermediate beam sections 18. With this construction, as fluid flows into the engine through the reed valve the primary reed member is curved uniformly from its base to its apex. The parabolic shape of the side edges of the webs 32 permits the primary reed to flex in an arcuate form of generally uniform radius providing for uniform distribution of stress across the entire extent of the reed member and further providing a smooth, less turbulent flow.

As fluid initially starts to flow through the reed valve, the secondary reed 14 opens. In accordance with the present invention, the primary reed 12 also starts to flex or open but at a slower rate than the secondary reed 14. Upon increased flow, the primary and secondary reeds open further with the secondary reed opening at a rate approximately twice that of the primary reed. The combination of the uniform smooth flexing of the primary and secondary reeds, the narrower upper portions of the beams and resultant wider upper ends of the ports, and the substantially simultaneous opening of the primary and secondary reeds, provide for a smoother fluid flow through the reed valve with less turbulence and substantially greater flow, resulting in improved performance of the valve.

Figure 2:
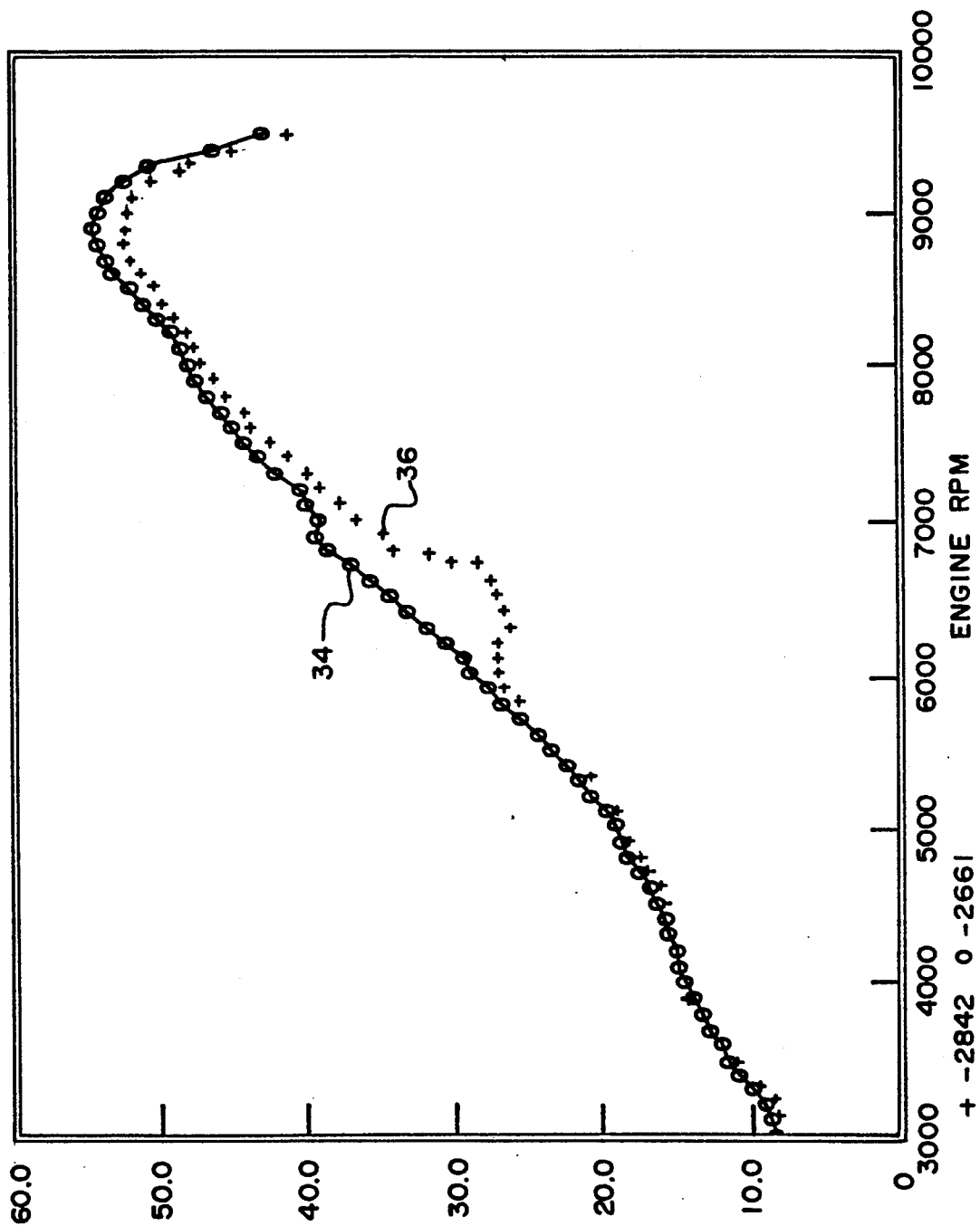
FIG. 2 is a graph showing relative power curves of a two-stroke cycle engine employing reed valves of the present invention and conventional multi-stage reed valves.
Figure 3:
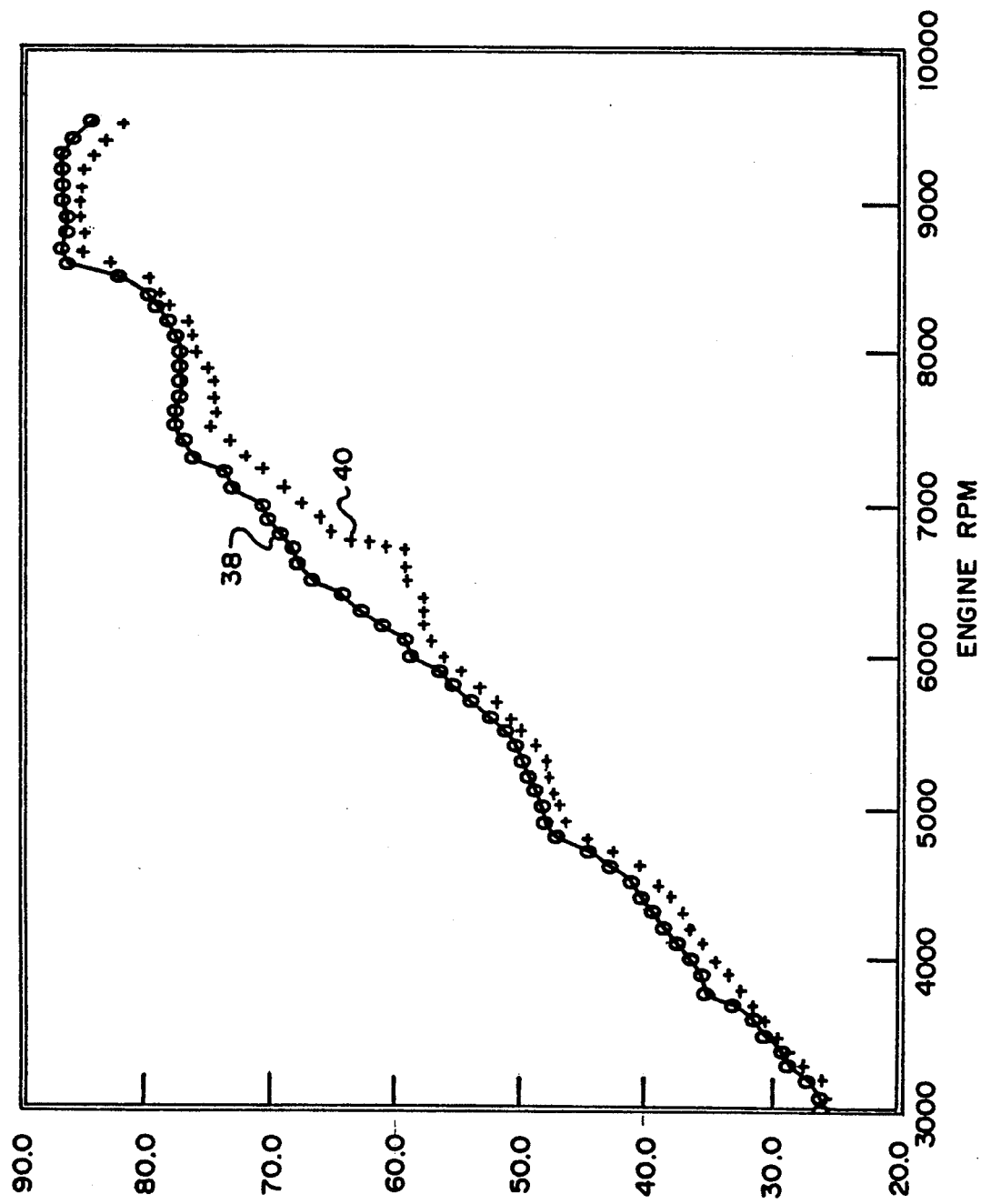
FIG. 3 is a graph showing relative flow curves through reed valves of the present invention and conventional multi-stage reed valves.

FIG. 2 shows relative power curves of a two-stroke cycle engine employing reed valves of the present invention and conventional multi-stage reed valves. The curve 34 depicts the power curve of the reed valve of the present invention while the curve 36 shows the power curve for a conventional multi-stage reed valve. As can be seen, the reed valve of the present invention provides a marked increase in power over a wide range of operation. Similarly, FIG. 3 shows relative flow curves through reed valves of the present invention and conventional multi-stage reed valves with curve 38 being that of the present invention and curve 40 that of a conventional multi-stage reed valve. These curves similarly show the substantially greater flow rates and superiority of the reed valve of the present invention over that of conventional multi-stage reed valves.

FIG. 5 illustrates a modified form of the present invention adapted for narrower reed valves than that of FIG. 1, wherein a pair of ports 42 are provided in the primary reed 44. The secondary reed 46 is similar to the secondary reed 14 of the embodiment of FIG. 1. The beam 48 in the primary reed is shaped similar to that of the beams 18 of the prior embodiment and performs the same function. This embodiment, as the embodiment of FIG. 1, provides superior flow with minimal turbulence and increased reed life.

Figure 6:
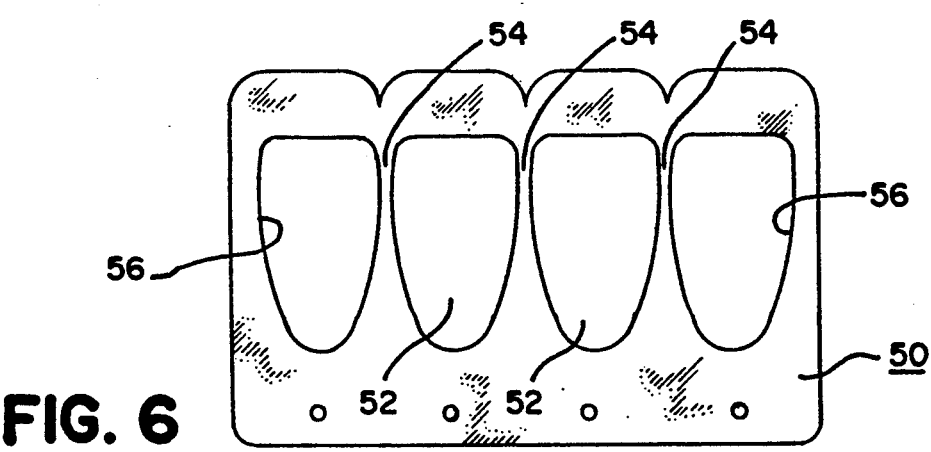
FIG. 6 is a plan view of a further modified form of primary reed member.
Figure 7:
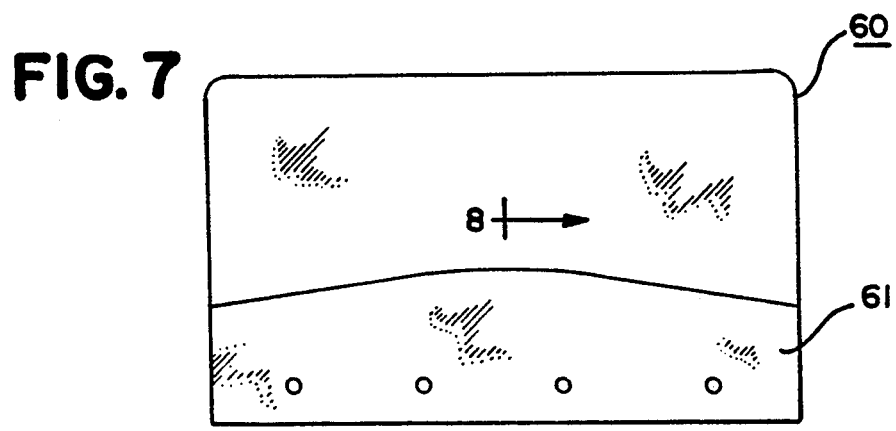
FIG. 7 is a plan view of a further modified form of secondary reed member.
Figure 8:
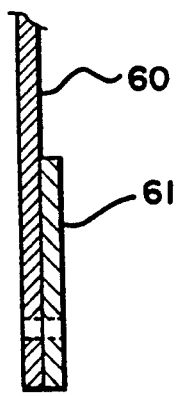
FIG. 8 is a sectional view taken along line 8—8 of FIG. 7.

FIGS. 6, 7 and 8 illustrate further modifications in the reed valve of the present invention. FIG. 6 shows a primary reed member 50 similar to that of FIG. 4 with multiple ports 52 separated by beam sections 54. In relatively wide reed valves utilizing reed members such as shown in FIGS. 4 and 6, it has been found that flow is not uniform across the width of the valve. The flow rate of fluid through the central portion of the valve is normally greater than at the side edge portions. To provide for uniform flexing of the primary reed member, the beam 54 at the area of greatest flow is wider than those at areas of lesser flow. In the embodiment of FIG. 6, the central beam 54 is wider than that of adjacent beams. Also, the outer side edge portions 56 of the two outer openings 52 are contoured to correspond to the shape of the beams 54. With this above described arrangement, in a relatively wide reed valve, the contour of the primary reed, when flexed, closely approaches an arcuate shape of uniform radius. By flexing the primary reed in this manner, the stress generated will be uniform over the entire extent of the reed member, preventing areas of concentrated stress and thereby prolonging the life of the reed member.

Figure 9:
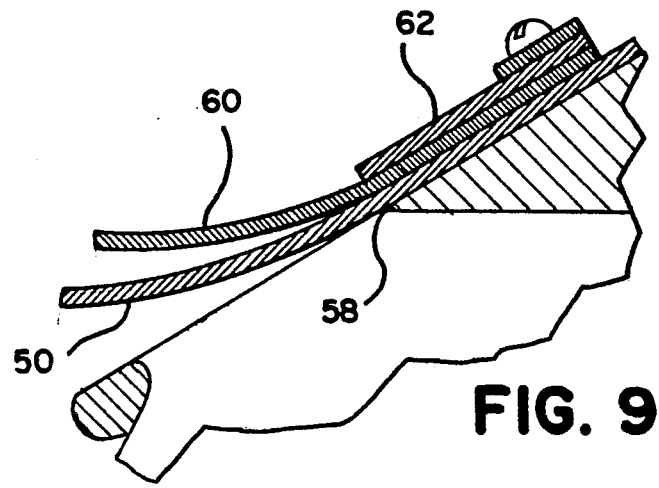
FIG. 9 is a sectional view of the base of a reed cage with a primary reed member and the secondary reed member of FIGS. 7 and 8 shown in an open position.

FIGS. 7 and 8 illustrate a modified form of secondary reed member 60 for wide reed valves. In this, a stiffening plate 62 is provided along the base of the reed member extending approximately one-third of the height of the reed and terminating close to the base of openings 58 in the cage 24, as shown in FIG. 9. The upper surface of the stiffening plate may be contoured, as shown, to provide greater support at the midsection of the reed where flow is greatest. With this structure, the secondary reed valve is prevented from flexing adjacent its base. This eliminates turbulence at the base of the secondary reed member 60 and further contributes to uniform flexing of the reed member 60 at all flow rates thereby increasing its performance and life.

While particular embodiments of the present invention have been illustrated and described herein, it is not intended to limit the invention to such a disclosure and changes and modifications may be incorporated and embodied therein within the scope of the following claims.

What is claimed is

1. A reed valve adaptable to be secured to a valve cage for controlling fluid flow into an internal combustion engine through a fluid intake, which comprises:

a first stage reed member and a second stage reed member;

the first stage reed member having a base at one edge thereof and an apex at an opposite edge thereof, said base secured to the valve cage;

the first stage reed member covering a valve seat oriented in a fluid intake of the engine and being sufficiently flexible to open the valve seat under the influence of decrease in pressure in the engine incident to engine operation at all engine speeds, said first stage reed member having therein multiple ports to permit fluid flow therethrough;

the second stage reed member being adapted to cover the ports in the first stage reed member and to restrict fluid flow through the reed valves during periods of no fluid intake into the engine, the second stage reed member being sufficiently flexible to open and uncover the ports in the first stage reed member under the influence of decrease in pressure in the engine incident to engine operation at all engine speeds, said secondary reed member being of greater flexibility than said primary reed member and opening upon decreased engine pressure at a greater rate than that of the primary reed member; and the first stage reed member including a beam between adjacent ports extending from the base to the apex of said first stage reed member, the edges of said beam adjacent the ports being in the shape of a smooth curve from the base to the apex and becoming substantially parallel to each other adjacent the apex, said beam being narrower at the apex than at the base.

2. The reed valve of claim 1 in which the multiple ports in said first stage reed member are arranged in side-by-side relationship and similar shaped beams separate each pair of adjacent ports.

3. The reed valve of claim 2 including beams at the side edges of the first stage reed member extending from the base to the apex thereof, said side edge beams being straight-sided.

4. The reed valve of claim 1 wherein the smoothly curved edges of said beams are a parabolic curve.

5. The reed valve of claim 2 including at least one central beam, opposite side edge beams, and intermediate beams intermediate said at least one central beam and said side edge beams;

said at least one central beam being wider in all respects than said intermediate beams.

6. The reed valve of claim 2 including side edge beams at opposite side edges of said first stage reed member, said side edge beams having edge portions adjacent said ports in the shape of a smooth curve from said base to said apex and being narrower at the apex than at the base.

7. The reed valve of claim 6 wherein the smooth curve of said edge portions of side edge beams is a parabolic curve.

8. The reed valve of claim 1 wherein said second stage reed member has a base and an apex; and
 a stiffening member secured to said second stage reed member positioned along the base thereof and extending toward the apex thereof.

9. The reed valve of claim 8 wherein said second stage reed member has opposite side edges and a midpoint, said stiffening member extending along said base between said opposite side edges; and
 said stiffening member extending closer to the apex of said second stage reed member at the midpoint thereof than at the side edges thereof.

10. The reed valve of claim 9 wherein the ports in said first stage reed member terminate in a base portion spaced from the base of said first stage reed member, said second stage reed member overlying said first stage reed member and coextensive therewith at the base of said first stage reed member, and said stiffening member terminating at a point substantially overlying the base portions of the ports in said first stage reed member.

11. The reed valve of claim 10 wherein said second stage reed member is intermediate said first stage reed member and said stiffening member.

12. The reed valve of claim 4 wherein the parabolic curve of the edge portions of the base is defined by the formula $$F/L = bd^2/6$$

where
 F is the force applied to the beam
 L is the distance from the base of the beam to the point where the width is measured
 b is the thickness of the beam
 d is the width of the beam at a specified L.

13. The reed valve of claim 7 wherein the parabolic curve of the side edge beams is defined by the formula $$F/L = bd^2/6$$

where
 F is the force applied to the beam
 L is the distance from the base of the beam to the point where the width is measured
 b is the thickness of the beam
 d is the width of the beam at a specified L.

* * * * *